UNITED STATES PATENT OFFICE.

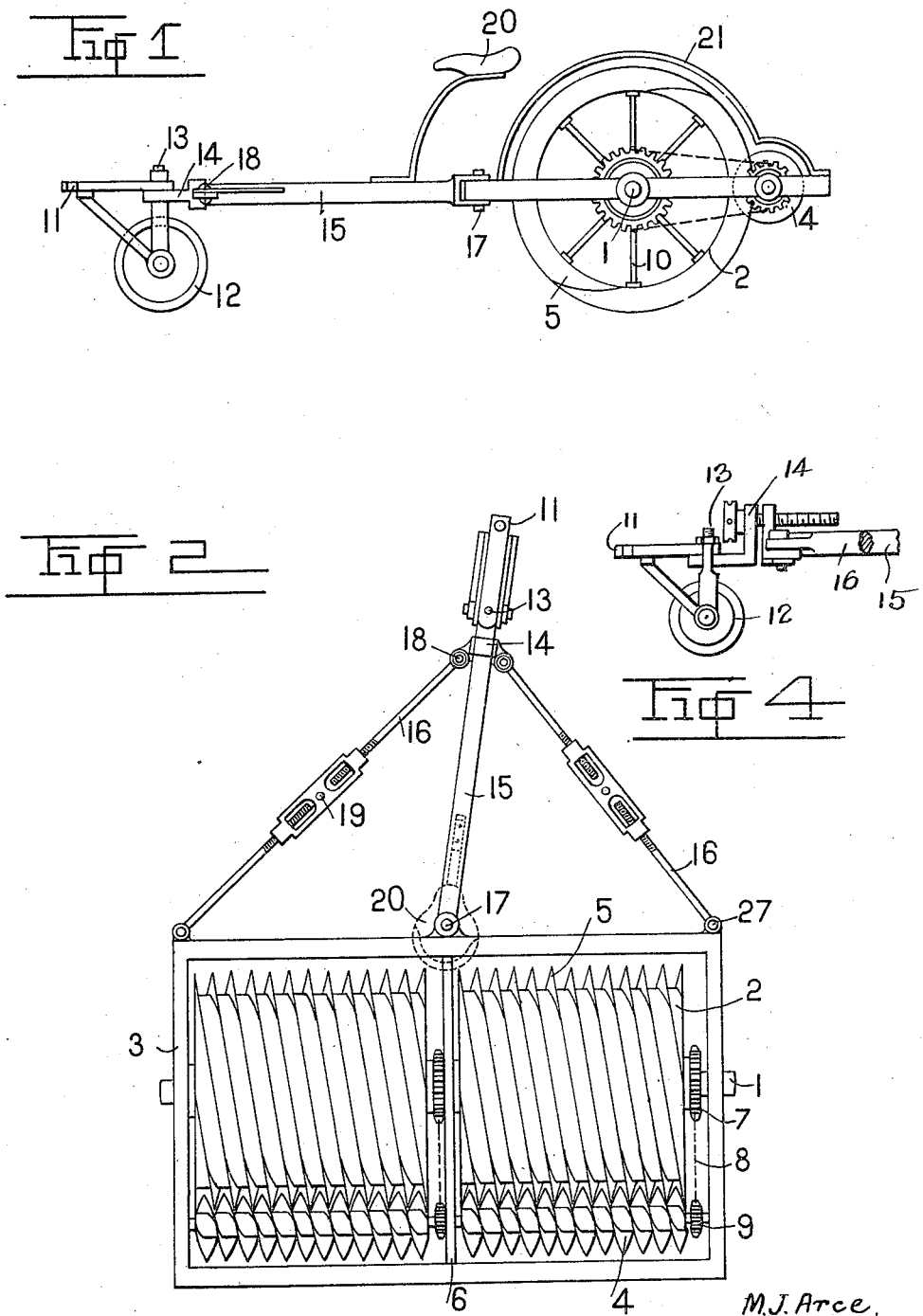

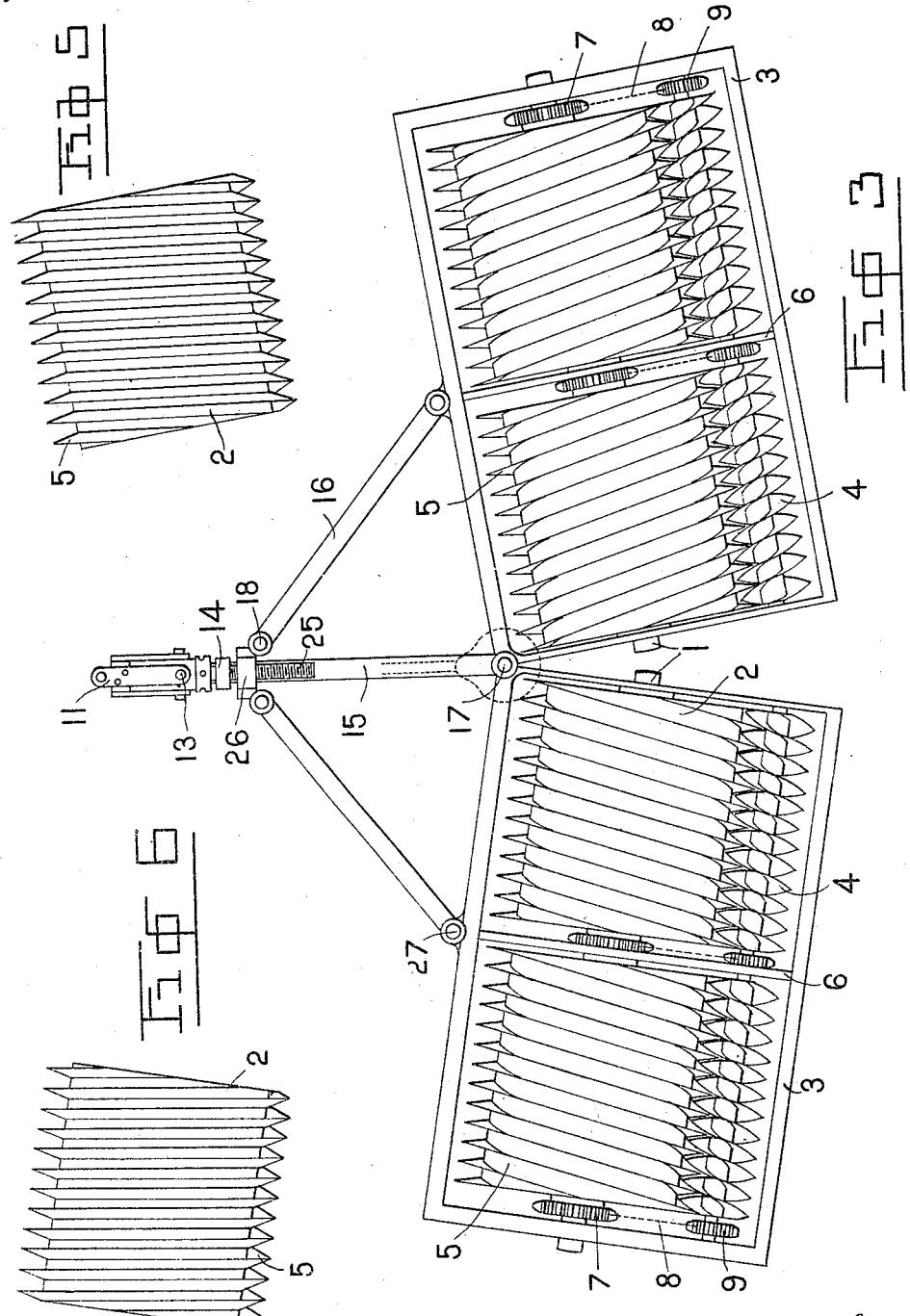

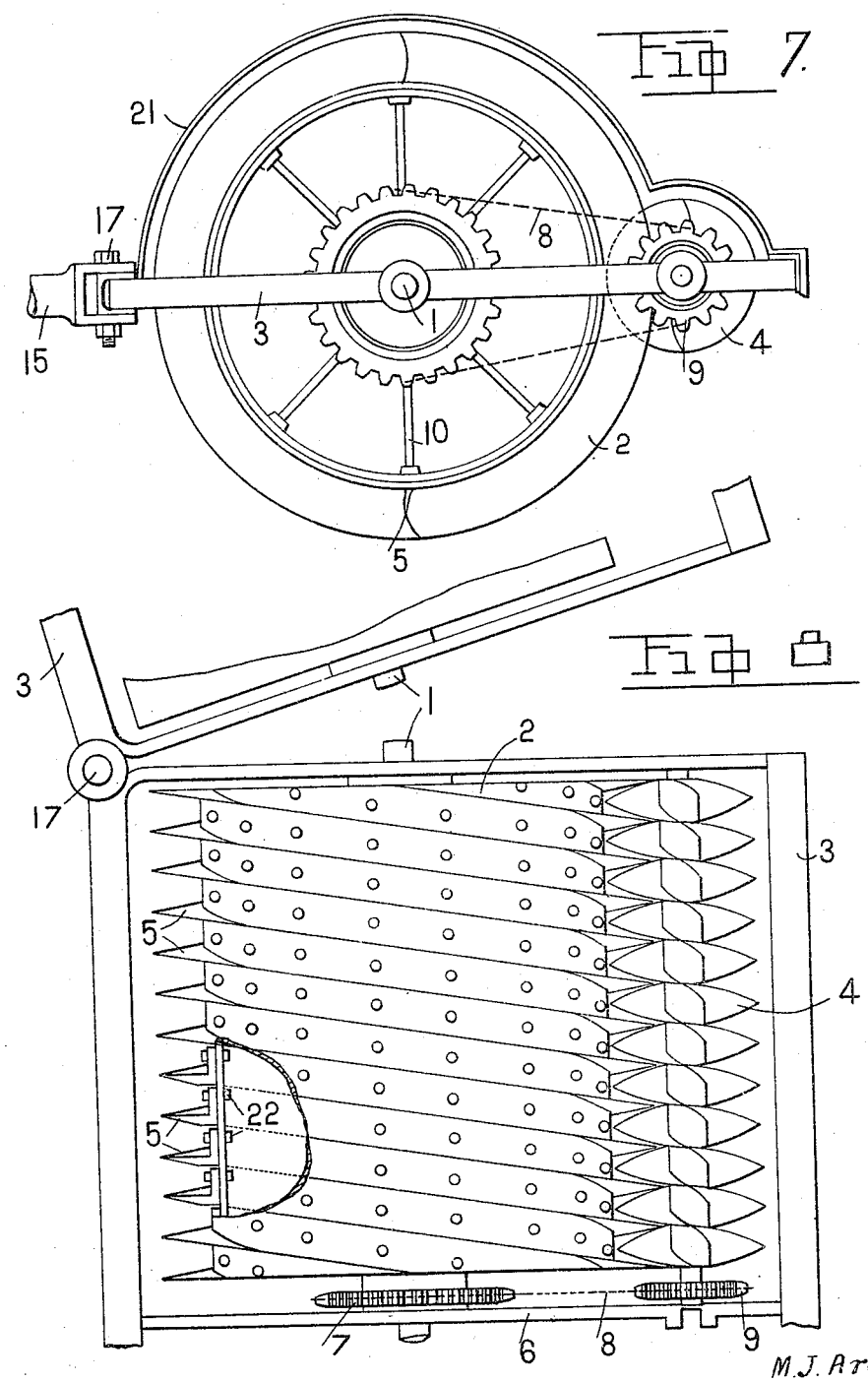

MANUEL J. ARCE, OF BUENOS AIRES, ARGENTINA.

PLOW AND THE LIKE.

1,237,446.  Specification of Letters Patent.  Patented Aug. 21, 1917.

Application filed February 2, 1915. Serial No. 5,667.

*To all whom it may concern:*

Be it known that I, MANUEL J. ARCE, citizen of Argentina, residing at Buenos Aires, Argentina, have invented new and useful Improvements in Plows and the like, of which the following is a specification.

When there is affixed to the outside of a cylinder a system of implements (shares, prongs, or any other kind which can be introduced into the soil to facilitate its adherence to the same) and the cylinder is rolled over the land, the implements will sink into the earth by the force of the weight of the cylinder to a depth depending on the weight of the cylinder, the free space between the implements and the thickness thereof. The space occupied by the implements introduced into the land, dislodges an equivalent amount of the soil which is translated into a lateral compression of the soil between the implements and as a consequence a strong adherence thereof to the surface of such implements takes place. If the rolling is continued, this force of adherence will tear up from the ground the soil held between the implements and cause it to remain adhered thereto and to the cylinder as it advances.

My invention relates particularly to a system of plows which utilizes this force of adherence to detach from the remainder of the soil a strip of ground of a thickness equal to the depth of penetration of the tools arranged on the outside of the cylinder in groups. The weight of the plow may be increased at will in order to obtain the penetration of the implements to the depth desired, according to the quality of the ground, the distance between the implements and the thickness of the latter. The force of adherence depends in its turn on the size of the free space between the implements and on the thickness and height of the same.

The soil adhering in this manner to the implements and to the cylinder, must be detached and broken up at the same time in order to make it fall to the ground, as otherwise when the cylinder continues to revolve and again comes into contact with the soil, the implements would not penetrate into the soil owing to the fact that the free spaces between them are filled. To obtain this result use is made of a device to scrape the implements and cylinder, and break up the soil held between them. The device is placed in combination with the cylinder of the plow at its rear end.

The plow is composed of one or two bodies, and each body consists of a frame on which is placed a shaft on which are mounted one or more cylinders of large diameter and of suitable width, and their weight can be increased at will. The cylinders may revolve freely and independently of each other. The traction power is applied to a beam mounted on the frame. The implements on the surface of the cylinder may be of different forms and arranged in the most suitable manner for obtaining the greatest adherence possible in the spaces between them of the strip of soil which it is sought to tear up from the ground for breaking up.

The surface of these implements should be roughened in order to secure greater adherence.

The axle or shaft of the plow attached to the frame must generally be placed normally to the direction of traction, but in order to facilitate the separation of the strip of soil adhering to the implements it is advisable in some kinds of land to give the axle a more or less pronounced inclination with relation to the line of traction, in order that the lateral gliding in the direction of the shaft may facilitate the separation of the soil held between the shares or blades from the ground. This inclination should be moderate and used only in cases in which the force of adherence by itself is insufficient to bring about the separation from the ground of the strip of soil held between the shares or blades. When the plow consists of two bodies, their axles or shafts may remain on the same straight lines or be inclined symmetrically as to the line of movement or traction.

It should be borne in mind that the greater the inclination of the shaft or shafts with relation to the line of traction, the greater will be the force of traction necessary to draw the plow. The advantage, therefore, of keeping the shaft or shafts of the plow in a position normal to the direction of traction is obvious.

In the rear of each cylinder, attached firmly to the frame or movable around the shaft of the plow, there is a device adapted to detach the earth held between the blades immediately after having been torn up from the ground, breaking it up and causing it to fall to the earth again, and thereby clearing the space between the implements in order to permit them to renew their function after another complete revolution.

The device for breaking up the soil turns when the cylinder is rolled, being actuated by a chain drive. The device may be made to revolve in the direction in which the cylinder rolls or in the opposite direction.

The form and components of the device for breaking up the soil varies with the form and arrangement of the implements. Thus when shares or blades having a spiral surface are employed, a helicoidal screw of one or more threads is employed, which threads engage the spirals formed by the blades, each cylinder being provided with one screw which turns in the same direction as the cylinder rolls, and is actuated by a chain drive.

In the attached drawings wherein like parts are similarly designated. Figure 1 represents a side view of a plow with a single shaft which may be inclined with relation to the direction of traction, and two cylinders with implements consisting of four blades having a developable continuous helicoidal surface and a scraping device attached to the frame consisting of a two-thread helicoidal screw. Fig. 2 is a bottom view of the same. Fig. 3 is a bottom view of a plow having two shafts symmetrically inclined with relation to the line of traction and two cylinders on each shaft, with implements consisting of four blades having a developable continuous helicoidal surface. Fig. 4 is a side view of a part of the same. Figs. 5 and 6 are bottom views of two cylinders provided with implements consisting of four blades having a continuous helicoidal surface, with upper and lower faces respectively. Figs. 7 and 8 are side and partial bottom views on a larger scale of a plow with two shafts.

With reference particularly to Figs. 1 and 2, 1 is the shaft of the plow; 2 the cylinders which revolve freely around shaft 1; 3 the frame on which is mounted shaft 1 and the bearings of the helicoidal screws 4 which detach and break up the soil held between the helicoidal surface blades 5; 6 is a separating bar between the cylinders which serves as a support for the bearings of the helicoidal screws 4 and as a connection between the two heads of the frame to impart greater rigidity thereto; attached to each cylinder is a chain drive 7 which communicates the rotating movement of the cylinder by chain 8 to pinion 9 mounted on the shaft of spiral screw 4 which engages between the blades 2 and detaches and breaks up in this manner the strip of soil held by adherence between the blades after having been torn up from the ground. The soil scraped from between the blades is broken up and falls to the earth. The cylinders 2 are mounted independently on the shaft 1 on axle boxes suitably arranged and connected by spokes 10 to the cylinders.

The traction power (mechanical or animal) is applied to beam 11 of wheel 12, which rotates around its shaft 13. This shaft passes through head 14 at the end of round bar 15, which communicates the traction power to it and to the stay rods 16. Bar 15 and rods 16 are attached to frame 3 by bolts 17 and 27, permitting them thus to effect a turning movement, the other ends of rods 16 being attached to head 14 by bolts 18. Owing to this turning movement, it is possible to give to shaft 1 and therefore, to the cylinders 2, any inclination desired with reference to the line of traction, represented in this case by the shaft of bar 15 which passes through bolt 17 which connects it with frame 3 and through shaft 13 of the wheel. This may be done by merely turning link 19 of one of the stay rods 16 in one direction, and that of the other rod in the other direction.

The driver takes his seat in seat 20 mounted on bar 15 on frame 3. The seat is shown in the bottom or ground views by means of dotted lines.

The greater or lesser inclination of the shafts of the cylinders in the case of Figs. 3 and 4 of a plow having two shafts symmetrically inclined with relation to the line of traction, is obtained in a form similar to that already described for a single shaft plow. The two frames with their respective shafts and cylinders may turn on bolt 17 of bar 15 and adopt any desired symmetrical inclination with respect to the line of traction represented by bar 15 which passes through bolt 17 and shaft 13. This movement is effected by means of a screw 25 attached to head 14. When it is turned it moves member 26, which is movable thereby along bar 15, and the lower part of which embraces said bar. This operates the stay-rods 16 one end of each of which is joined thereto by bolts 18, the other ends being connected with the two frames by bolts 27. The longitudinal movement of member 26 together with the stay rods 16 communicates a turning movement to the two frames around bolt 17, symmetrically with relation to the line of traction, giving thus both shafts inclinations of a more or less pronounced character and symmetrical with relation to said line.

Figs. 5 and 6 show two cylinders provided with blades having a continuous helicoidal surface with upper and lower faces respectively.

Figs. 7 and 8 show on a larger scale the details of a double-shaft plow provided with blades having a continuous developable helicoidal surface, Fig. 8 showing a mode of attaching the blades to the cylinder by screws 22.

In the case of a single-shaft plow with a number of cylinders, as shown in Figs. 1 and 2, the line of traction is usually normal to the shaft 1. If on account of the peculiarity of the ground, it is advisable to give shaft 1 some inclination with relation to the line of traction, it may be done by manipulating links 19 to bring the parts into a position such as shown in Fig. 2.

In operation the blades are pushed into the ground during the rolling and in doing so compress the soil firmly and hold it between them by adherence. As the rolling continues, the strip of soil thus held is torn up from the ground to a thickness equal to the depth of penetration of the implements, and to a width equal to that of the cylinders, and raised until it meets the breaking up or pulverizing device.

What I claim as new and desire to secure by Letters Patent is:—

1. A plow or the like comprising in combination a frame, a rotatable cylinder mounted therein, cutting means projecting from the surface of said cylinder and arranged helically thereon, and rotatable helical cutters, projecting between the convolutions of said cutting means, for removing the soil which adheres thereto.

2. A plow or the like comprising in combination a frame, a rotatable cylinder mounted therein, helically arranged cutting elements projecting from the surface of said cylinder, a shaft parallel to said cylinder, means helically arranged on said shaft, adapted to engage between the said helically arranged cutting elements, to remove the soil which adheres between the latter, and means for rotating said shaft from the cylinder.

3. A plow or the like comprising in combination a frame consisting of two parts connected by a hinge, a pair of independent plowing elements mounted therein, a tractor bar connected to said hinge, and means for altering the angle which said bar makes with the axis of each plowing element comprising a screw threaded member engaging with, and slidable along, said bar, rods hingedly connecting said member to the two parts of said frame one on each side of the hinge, and a screw rotatably mounted on said bar and engaging said screw-threaded member.

In testimony whereof I have signed my name to this specification in the presence of two subscribing witnesses.

MANUEL J. ARCE.

Witnesses:
  E. BONOTER.
  CHARLES J. PICAR.

Copies of this patent may be obtained for five cents each, by addressing the "Commissioner of Patents, Washington, D. C."